Nov. 20, 1945.　　A. J. LIEBMANN ET AL　　2,389,263
METHOD OF PRODUCING 2:3-BUTANEDIOL
Filed July 9, 1943
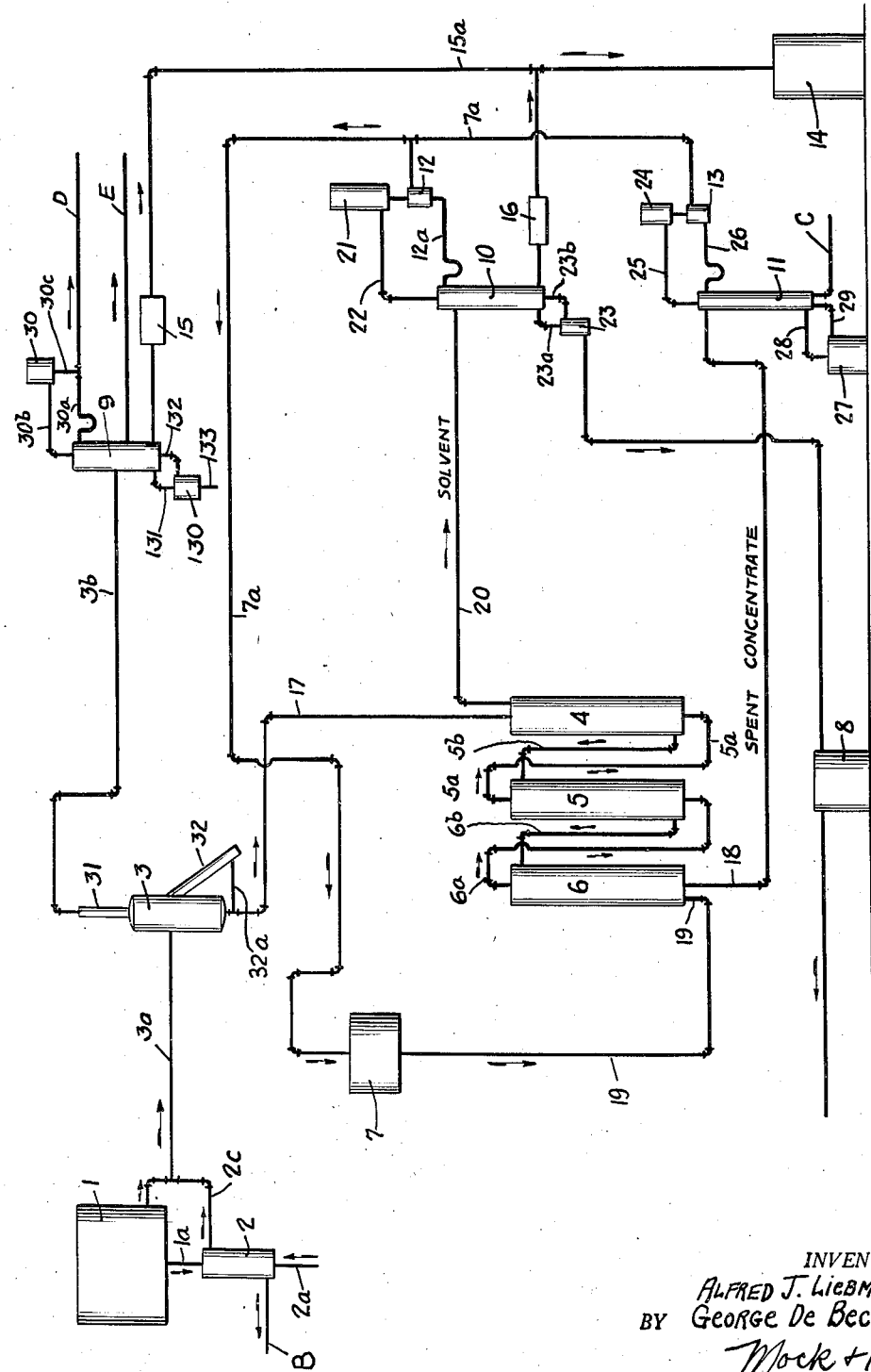
INVENTORS
ALFRED J. LIEBMANN
BY GEORGE De BECZE
Mock + Blum
ATTORNEYS Patented Nov. 20, 1945

2,389,263

UNITED STATES PATENT OFFICE 2,389,263

METHOD OF PRODUCING 2:3 BUTANEDIOL

Alfred J. Liebmann, Cincinnati, Ohio, and George de Becze, Lawrenceburg, Ind., assignors to Schenley Distillers Corporation, New York, N. Y., a corporation of Delaware Application July 9, 1943, Serial No. 494,054

2 Claims. (Cl. 260—637.)

Our invention relates to new and improved method of producing a substantially pure 2:3 butylene glycol, which is also designated as 2:3 butanediol. Its formula is $CH_3CHOHCHOHCH_3$.

This compound occurs in several stereo-varieties, which have different melting points, especially if they contain water or other impurities. The melting point of the levo-rotary compound is about 15° C. Generally speaking, this compound is a colorless liquid at room temperature of about 25° C., and its boiling point is 180° C.–182° C. It is miscible with water in all proportions.

The principal objects of our invention are greatly to reduce the cost of extraction of the butylene glycol from a fermented beer which contains said glycol, by first concentrating the original fermented beer, and then recovering said glycol from said concentrated fermented beer by means of extraction, precipitation, or by a combination of extraction and precipitation. Such concentrated beer preferably contains about 15% to 25% of said butanediol by weight. Said concentrate contains the dissolved and finely dispersed colloidal solids of the original unconcentrated beer.

Numerous additional objects of our invention will be stated in the annexed description, and flow-sheet-diagram, which illustrates a continuous process according to our invention. Our method can be carried out by batch treatment, or in a semi-continuous method.

It has been well known to produce butylene glycol from a fermented beer which is produced by fermenting starches and sugars with various strains of bacteria, as stated in U. S. Patent No. 1,899,158, issued on February 28, 1933, British Patent No. 315,263, British Patent No. 335,280, and in various technical publications. Any carbohydrate can thus be fermented to make the beer, and in particular, carbohydrate mashes of the type which can be fermented to produce ethyl alcohol. We prefer to ferment the carbohydrates with aerobacillus polymyxa, in order to produce a beer which contains said butylene glycol, in addition to some ethyl alcohol. We can also use aerobacter aerogenes. The invention is not limited to any particular fermenting agent, or to the control of the fermentation, or to the treatment of the fermented beer prior to extracting the glycol therefrom.

If we use aerobacter aerogenes as the fermenting agent, the original unconcentrated beer may contain from 4.2% to 5.2% by weight of said glycol, depending upon the control of the fermentation, and the length of the fermentation period.

If we use aerobacillus polymyxa as the fermenting agent, the percentage by weight of the glycol in the original unconcentrated beer, as determined by extraction, may be from 1.5% to 2.5% by weight. This depends upon the dilution of the mash. In addition, such fermented beer will also contain ethyl alcohol.

Heretofore, the extraction of butylene glycol from the unconcentrated fermented beer has been difficult and expensive.

Our invention relates generally to the extraction of said butylene glycol from any fermented beer, and it is not limited to the details of the preferred example stated herein.

The unconcentrated beer, if it has been fermented by aerobacillus polymyxa, is preferably treated with lime and it is allowed to stand, until it settles to a fairly clear state. If the beer has been fermented with aerobacillus polymyxa, such treatment results in the formation of a bottom layer of sludge, whose volume is from 10% to 20% of the volume of the unconcentrated beer. A fairly clear unconcentrated beer can easily be separated from said sludge. In our method, this separated unconcentrated beer is concentrated, prior to extracting the glycol therefrom. The unconcentrated beer which has been separated from the sludge contains dissolved solids, and it also contains finely dispersed solids. This sludge contains some glycol. This separated sludge can be washed with hot water, in order to recover said glycol therefrom, and the wash water can be added to the unconcentrated beer.

If the mash is fermented with aerobacter aerogenes, the mash is preferably filtered prior to fermentation, so that considerably less filtration or separation will be necessary to remove excess calcium carbonate and the small quantities of precipitated organic substances. In such case, the fermented beer contains finely divided solids and dissolved solids.

The concentrated beer contains the original dissolved and dispersed solids of the unconcentrated beer, and substantially all the glycol of the unconcentrated beer. The beer can be concentrated to about 10%–12% of its original volume, if it has been fermented by aerobacillus polymyxa. If the beer has been fermented by aerobacter aerogenes, it is concentrated to about 25%–33⅓% of its original volume.

As an example, a batch of concentrated beer which contains 10% by weight of said glycol, may contain 30% by weight of solids.

If the beer is concentrated too much, the concentrate is not miscible with solvents, and no extraction or precipitation would be possible. This is because a beer which is too concentrated becomes too heavy, or even solid. Hence, according to our method, the concentrated beer is in liquid form, which is freely miscible with solvents.

As another example, a batch of concentrated beer which contains 14% by weight of said glycol, may contain 48.4% by weight of solids.

In order to extract said glycol from said concentrated beer, we can use one or more selective solvents, which are selected from three classes of such solvents. The selective solvent will preferably dissolve substantially all of the glycol in the concentrate, and it will dissolve a minimum of the solids of the concentrate. The selective solvent or the mixture of selective solvents, may precipitate substantially all or at least part of the solids of the concentrate, which are not dissolved in said selective solvent or mixture of said selective solvents, in a residual phase. The residual phase which is formed in the concentrate by such precipitation may be solid, semi-solid, or a thick liquid, depending upon the choice of the selective solvent or mixture of selective solvents.

The phase of the concentrate in which the glycol is dissolved in the selected solvent, is designated as the solvent phase or liquid phase.

The first class of selective solvents consists of liquids which can be intermixed with water in any proportion. This first class of solvents includes acetone, ethyl alcohol, methyl alcohol, and others.

A solvent of the first class preferably precipitates the major part of the dissolved solids and coagulates them with the fine suspended solids present in the concentrated beer in the residual phase, in addition to preferably dissolving substantially all the butylene glycol of said concentrated beer, so that said glycol is in the solvent phase. Hence, the admixture of the concentrated beer with a solvent of the first class results in a solvent phase which is a mixture of the water of the concentrated beer with the solution of the butylene glycol in the selected solvent, and also in the formation of a definite residual phase which should contain as much as possible of the solids of the concentrate. Some of the butylene glycol is taken up in the residual phase.

We can also use a second class of selective solvents, which can be intermixed with water in only limited proportion. This second class of solvents includes butanol, fusel oil (or higher aliphatic alcohols), ethyl acetate.

We can also use a third class of solvents, which are not miscible with water, in combination with members of the first class or second class. Such solvents of the third class include various hydrocarbon solvents, such as benzol, toluol, xylol, solvent naphtha, kerosene, etc. The action of a solvent of the third class is a pure extraction action, with little or no precipitation of the solids of the concentrated beer.

The solvent action on the glycol of members of the third class, is inferior to the solvent action of members of the first class or second class. In a continuous extraction process, we prefer to use members of the second class. In such continuous extraction process, we can also use mixtures of members of the first class and the second class, and mixtures of members of the first class and the third class. Solvents of the first class alone are used in a batch precipitation process, as distinguished from a continuous process.

In a batch precipitation process, using any solvent or precipitating agent, we form a gummy semi-solid precipitate which always remains in the lower phase. In a continuous process in which we use an extracting column, the spent concentrate is a thick liquid, and not a gummy semi-solid mass. Such thick liquid always passes to the bottom of the extracting column in the continuous process.

The gummy semi-solid precipitate which is produced by members of the first class, never rises to the top of the batch. Such gummy precipitate will not flow in a column.

In batch precipitation, we use closed tanks which have suitable agitators.

In the continuous process, two phases are produced. The upper phase will contain at least a major part of the solvent in which at least a major part of the glycol is dissolved, together with some water and some dissolved solids. This upper phase should contain a maximum proportion of the solvent and the dissolved glycol. In said continuous process, the lower phase has at least a major proportion of the solids, some of the glycol, some water, and a small proportion of the solvent.

We prefer to mix the concentrated beer with a single solvent. However, the invention is not limited to this, because the beer may be intermixed with a plurality of solvents of one class or of different classes.

The solvent preferably dissolves about 80%–85%, or even more, of said butylene glycol of the concentrated beer, said proportion being by weight. If a precipitate is formed by the action of the solvent, the remainder of the butylene glycol will be substantially absorbed in said precipitate, which may be very thick and gummy.

We prefer to use a solvent which will dissolve a maximum of the butylene glycol and a minimum of the solids, so that the solvent phase or liquid phase will contain nearly all the glycol, and very little solids. The preferred solvents are cheap, have low boiling points and low latent heats, and such solvents can be easily separated from the dissolved butylene glycol by fractional distillation.

In order to secure best results, we prefer to ferment the beer by means of aerobacillus polymyxa, and to use a solvent of the first class or of the second class, such as methyl alcohol, ethyl alcohol, butanol, raw fusel oil, or ethyl acetate. If the beer is thus fermented, the volume of the selected solvent of the first class or of the second class which is used in making an extraction, may be 10% to 25% of the volume of the unconcentrated fermented beer, and even less.

If the beer has been fermented by aerobacter aerogenes, the volume of the solvent of the first class or the second class may be from 20% to 50% of the volume of the unconcentrated fermented beer.

Several examples of the treatment of the beer concentrate are stated as illustrations of the invention, it being understood that the invention is not limited to the details thereof.

*Example 1*

The batch of concentrate contains 10% by weight of said glycol and 30% by weight of solids, the remainder being water. Ten liters of the concentrated beer are intermixed with 20 liters of acetone. Said batch contains 1000 grams of the glycol and 3000 grams of solids. The mixing may be done at ordinary room temperature, or the concentrate and the solvent may be preheated to a temperature of approximately 50° C., prior to admixing them.

Since this is a batch extraction, the mixing is performed in a closed tank, as previously described.

The extraction results in an upper liquid phase and in a bottom residual phase. The bottom residual phase is a gummy semi-solid. The upper liquid phase has a volume of 27.5 liters and the bottom residual phase has a volume of 2.5 liters.

The weight of the glycol in said upper liquid phase is about 3.15% of the weight of said upper liquid phase. Hence, said upper liquid phase has about 868 grams of the glycol. The weight of the solids in said upper liquid phase is about 3% of the weight of said upper liquid phase, namely, about 825 grams.

The weight of the glycol in said bottom phase is about 5.28% of the weight of said bottom phase, namely, about 132 grams. The weight of the solids in said bottom phase is about 87% of the weight of said bottom phase, namely, about 2175 grams.

Since said upper liquid phase contains about 868 grams of the glycol, out of a total weight of 1000 grams, the percentage of recovery of the glycol in the upper liquid phase is about 86.8%.

A major portion of the spent concentrate, from which the glycol has been extracted by dissolving the glycol in the acetone, is in the upper liquid phase. The bottom gummy semi-solid residual phase can be easily separated from the upper liquid phase.

The 2.5 liters of said gummy residual phase, separated from the liquid phase, are dissolved in 2 liters of hot water, and said solution is mixed with 4 liters of acetone, in order to secure a second batch precipitation and extraction. This second step results in an upper liquid phase whose volume is 6 liters, and which contains 1.47% by weight of dissolved glycol, namely, 88 grams. Said liquid phase contains 1% by weight of solids, namely, 60 grams of solids. The 2.5 liters of residual phase which result from the second precipitation, contain 1.78% by weight of the glycol, namely, 44 grams, and 84.6% of solids, namely, 2115 grams. The percentage of recovery of the glycol in the second precipitation is 8.8%.

A total of 95.6% of the glycol is recovered in the two precipitations or extractions.

*Example 2*

This is another example of batch extraction.

The batch of concentrate contains 14% by weight of the glycol, and 46.40% by weight of solids.

100 cc. of said concentrate are mixed with 200 cc. of acetone, under the conditions stated in Example 1. The bottom residual phase is a gummy semi-solid, whose volume is about 35 cc. The volume of the upper liquid phase is about 260 cc. The upper liquid phase contains 4.61% by weight of dissolved glycol, namely, about 11.98 grams of said glycol. This dissolved glycol in the upper liquid phase is 85.6% of the 14 grams of glycol originally in the concentrate. Said upper liquid phase contains 3.80% by weight of dissolved solids, namely, 9.88 grams of the 46.4 grams of the solids originally in the concentrate. Substantially all of the remaining 36.52 grams of solids are precipitated in the gummy semi-solid residual phase.

If the volume of acetone is increased to 300 cc. in extracting 100 cc. of the concentrate, the residual phase is also a gummy semi-solid. The recovery efficiency of the glycol in the liquid phase is increased to 94.8% by using 300 cc. of acetone. The volume of the liquid phase is then about 355 cc. and the volume of the residual phase is then about 44 cc.

*Example 3*

This is another example of batch extraction.

Ethyl alcohol is used as the precipitant and selective solvent. If 200 cc. of ethyl alcohol are intermixed with 100 cc. of the concentrate of Example 2, the recovery efficiency of the glycol in the upper liquid phase is 94.3%. By using 300 cc. of ethyl alcohol, the recovery efficiency in the upper liquid phase is increased to 99.6% because the upper liquid phase then has a volume of 340 cc. and it contains 4.10% of dissolved glycol, namely, 13.94 grams. The residual phase is also a gummy semi-solid. Ethyl alcohol will dissolve a greater portion of the solids than acetone.

Methyl alcohol has substantially the same recovery efficiency as the ethyl alcohol, in the batch process. If 200 cc. of methyl alcohol are used, the residual phase is a semi-liquid. If 300 cc. are used, the residual phase is a spongy mass.

Methyl alcohol will dissolve a greater portion of the solids than ethyl alcohol.

*Example 4*

Butanol or butyl alcohol is used to extract the concentrate mentioned in Example 2. The residual phase is a thick liquid, if 200 cc. or 300 cc. of butyl alcohol are intermixed with 100 cc. of said concentrate. If 200 cc. of butanol are used, the liquid phase has a volume of about 220 cc. and it contains 6% by weight of dissolved glycol, corresponding to a recovery efficiency of 94.3%. The volume of the residual phase is 60 cc.

If 300 cc. of butanol are used, the recovery efficiency drops to 91.9%. Recovery efficiency always refers to the extraction of the glycol in the liquid phase.

Butanol can be used in a continuous extraction process, using an extraction column like the column 4. In such case, the concentrate is introduced at the top of the extracting column 4, and the concentrate leaves said column 4 at the bottom thereof. The concentrate which passes out of the bottom of column 4 is then introduced into the top of the column 5, and it flows downwardly to pass out of the bottom of said column 5. The concentrate always flows downwardly through each extracting column. The solvent flows upwardly through the respective extracting column and said solvent, together with the dissolved glycol therein, then flows to a fractionating column, such as column 10. The specific gravity of the downwardly flowing thick liquid phase, is always greater than the specific gravity of the upwardly flowing solvent phase.

In the continuous process, there are only two phases, namely, the solvent phase, and the thick liquid phase. The thick liquid phase includes the spent concentrate. This thick liquid phase flows very easily. The semi-solid thick paste is secured only when members of the first class are used in a batch system.

*Example 5*

The concentrate of Example 2 is extracted with ethyl acetate, in the respective proportions specified in Example 2. The residual phase is also a thick liquid. If 200 cc. of ethyl acetate are used, the recovery efficiency is 34.3%. If 300 cc. of ethyl acetate are used, the recovery efficiency is increased to 52.5%. Ethyl acetate can also be used in a continuous extraction process. The recovery efficiency of ethyl acetate is low, but it dissolves only a small proportion of solids, and it can be easily separated from the spent concentrate of the thick liquid phase.

Example 6

The concentrate specified in Example 2 is extracted with fusel oil, in the respective proportions specified in Example 2. The residual phase is a medium thick liquid. If 200 cc. of fusel oil are used, the recovery efficiency is 68.15. If 300 cc. of fusel oil are used, the recovery efficiency is 80.8%. Fusel oil can also be used in a continuous extraction process.

Example 7

Isopropyl acetate is used as a selective solvent for the concentrate specified in Example 2, in the respective proportion therein stated. If 200 cc. of isopropyl acetate are used, the recovery efficiency is 32.8%. If 300 cc. of isopropyl acetate are used, the recovery efficiency is 48.3%.

Isopropyl acetate has rather low recovery efficiency, but it has the same advantages as ethyl acetate.

The beer specified in said examples was made with the use of polymyxa, as the fermentation agent.

Any of the solvents above mentioned can be used in the multi-step method previously disclosed, in order to recover the glycol from the residual phase. When fusel oil, namely, a mixture of the higher aliphatic alcohols, is used in such two-step process, 92% of the total glycol is recovered.

The best precipitating solvents in batch extraction are acetone, methyl alcohol, and ethyl alcohol.

It is therefore possible to extract 80%–95% or more of the glycol of the concentrate in the liquid phase. Said liquid phase will ordinarily contain in dissolved form, from 1% to 15% by weight of the solids originally in the concentrate.

The liquid phase can be easily mechanically separated from the residual phase.

The reason for using different solvents in producing the liquid phase, and in subsequently treating the residual phase, is that many solids are soluble in one solvent and not in another solvent. The material of the residual phase, after the glycol has been separated therefrom, can be dried and utilized.

The solids of the concentrated beer, which are separated or precipitated, are unfermented sugar, dextrines, proteins, and mineral salts.

In operating our process continuously, we prefer to use a selective solvent like butanol, so that the residual phase is a thick liquid, which flows easily.

The apparatus which is shown in the annexed diagram, and which is used to carry out the continuous process, includes a tank 1, in which the unconcentrated fermented beer is settled after treatment with lime. Clear unconcentrated beer flows from tank 1 through pipe line 3a into evaporator 3. The sludge of the fermented beer settles to the bottom of tank 1. Said sludge flows continuously through pipe 1a into the continuously-operated washing column 2. Wash water is continuously forced upwardly into column 2, through pipe 2a. The wash passes through pipe 2c, into pipe line 3a. The spent sludge passes through pipe line B to the dry house. We can use a battery of two or more settling tanks 1, which are connected in parallel. This detail is not illustrated, as it is old per se. The clear beer, which contains said glycol, and which may contain ethyl alcohol, is concentrated under vacuum in evaporator 3. The ber is thus concentrated under a pressure of 8 inches of mercury, or less.

We can use two or more evaporators, which are connected in series. As this detail is conventional, it is not illustrated.

The evaporator 3 has the usual vapor line 31. The beer in said evaporator 3 is heated by a conventional calandria 32. The tubes of this calandria, and the means for heating the outer walls of said tubes, are conventional and are therefore not shown.

The term "calandria" refers to a heat exchanger, through which a liquid is circulated in order to raise its temperature.

The tubes of said calandria 32 are connected by pipe or pipes 32a to the bottom of evaporator 3. The tops of the tubes of said calandria 32 communicate with the vapor space of the evaporator 3, above the level of the liquid in said evaporator 3.

The beer is heated in the evaporator 3 to a temperature of about 58° C., if the beer is concentrated under a pressure of about 8 inches of mercury.

As previously stated, if the beer has been fermented by aerobacillus polymyxa, it is concentrated to about 1/8 to 1/16 of the original volume. If the beer has been fermented by aerobacter aerogenes, it is concentrated to about 1/3 to 1/4 of its original volume.

The vapors from the evaporator 3 consist of a mixture of water vapor, glycol vapor, and ethyl alcohol vapor. Said mixed vapors are passed into the usual indirectly-heated plate fractionating column 9, through vapor outlet 31 and pipe line 3b. This column 9 may be replaced by a plurality of such columns.

The ethyl alcohol vapor is passed from the top of column 9, through pipe line 30b and through condenser 30. The liquid alcohol, which is condensed in condenser 30, passes out through pipe line D. The condenser 30 is connected to column 9, through the usual reflux pipe lines 30c and 30a. The water vapor is withdrawn through pipe line E.

The glycol is recovered at the bottom of column 9 and it is passed through cooler 15 and pipe line 15a, to tank 14. The fractionating column 9 has the heating calandria 130, which has the pipe connections 131, 132, and 133.

The internal tubes of this calandria 130 are connected to column 9 by pipes 131 and 132. The outer walls of said tubes are heated by steam which is supplied by pipe 133.

The temperature of any of the calandrias will depend upon working conditions, such as the number of plates in the respective column, the height of the liquid on the plates, and the pressure at which the distillation is performed. The columns 9 and 10 may operate wholly or partially, at less than atmospheric pressure. The column 11 may operate under atmospheric pressure. When a column is operated under full atmospheric pressure, the temperature of the respective calandria will be about 220° C.

The concentrated beer from evaporator 3 flows through pipe line 17 into the top of extraction column 4. This is the third or last of a series of extraction columns 4, 5, 6. The selective solvent, such as butanol, flows from the tank 7, through pipe line 19, upwardly into the bottom of extracting column 6. The solvent, and its dissolved glycol, flows out of the top of extracting column 6 through pipe line 6a into the bottom of the extracting column 5, upwardly through column 5, and from the top of extracting column 5 through pipe line 5a to the bottom of extracting column 4 and upwardly through column 4. The solvent, together with the dissolved glycol and the dissolved solids, passes out of the top of column 4, and then it flows continuously through pipe line 20 into the fractionating column 10, which is of the same type as the column 9.

The concentrate thus continuously flows counter-current to the continuously flowing solvent in the extracting columns 4, 5, 6. Pipe 5b is connected to respective ports which are respectively located a short distance above the bottom of column 4, and a short distance below the top of column 5. Pipe 6b is connected to respective ports which are respectively located a short distance above the bottom of column 5 and a short distance below the top of column 6. The concentrate flows downwardly through each of the columns 4, 5, and 6. The spent or extracted concentrate flows as a heavy liquid out of the bottom of extracting column 6, through pipe 18, into the stripping column 11. This stripping column 11 is connected to a conventional calandria 27 by pipes 28 and 29.

The solvent and its dissolved glycol flow only through pipe 20 into the fractionating column 10. The non-volatile solids in said solvent will collect in the bottom of column 10, and in calandria 23, as a heavy paste, which is fluid when it is hot. Such paste has traces of the glycol, which can be recovered by a batch precipitation. This heavy paste is collected continuously or intermittently in the tank 8.

The vapors pass from stripping column 11 through pipe 25 and through condenser 24, into decanter 13. The solvent is separated in the decanter 13 from the aqueous lower phase, since the specific gravity of butanol is less than that of water. The separated solvent is returned through pipe line 7a to tank 7. The lower aqueous phase is refluxed from decanter 13, through reflux pipe line 26, into stripping column 11.

The final spent concentrate passes out of the bottom of stripping column 11, through pipe line C, to the dry house. Said spent concentrate is dried to produce a feed product.

The fractionating column 10 is connected to the tubes of the heating calandria 23 through pipes 23a and 23b.

The vapors from fractionating column 10 are passed through pipe 22 and through condenser 21, into decanter 12, in which the solvent is separated from the water. The upper phase, which contains the solvent, is fed to tank 7. The aqueous lower phase is refluxed into column 10, through reflux pipe line 12a.

The crude glycol is passed out of the bottom of fractionating column 10, through cooler 18, and it is collected in tank 14.

The crude glycol which is collected in tank 14 contains some water and some volatile impurities. Such crude glycol is purified by fractional distillation.

The extracting columns 4, 5, and 6 are continuously filled with concentrate and solvent, which flow continuously through said columns in respective opposite direction.

We have described preferred embodiments of our invention, but it is clear that numerous changes and omissions and additions can be made without departing from its scope.

We believe that the continuous process is the most important feature of our invention. An important part of the continuous process is to concentrate the original beer to a maximum degree, while maintaining the spent concentrated beer in the form of a liquid which can flow easily at normal temperature of 20° C.–25° C., or at a higher temperature.

We preferably concentrate the fermented beer by removing water therefrom, or by removing water and ethyl alcohol therefrom, until a mixture of the concentrate and the solvent, in which the volume of the concentrate is at least one-third the volume of the solvent, separates into a liquid solvent phase and into a residual phase which is mechanically separable from said liquid solvent phase. Since the volume of the solvent is not more than three times the volume of the concentrate, the method is very efficient. Said residual phase will preferably contain at least a major portion of the solids of the concentrate. As previously noted, this residual phase may be a thick liquid which includes the spent concentrate.

We claim:

1. A method of extracting 2:3 butanediol from a beer which has been fermented with aerobacillus polymyxa, which consists in treating said beer with lime to form a sludge whose volume is substantially 10% to 20% of the volume of said beer, separating the liquid phase of said beer from said sludge, said separated liquid phase containing dissolved solids and finely dispersed solids, concentrating said separated liquid phase to substantially 10%–12% of the volume of the original beer, said concentrate being liquid and being freely miscible with a solvent for said 2:3 butanediol which is selected from a class which consists of butanol, fusel oil, isopropyl acetate and ethyl acetate, continuously downwardly flowing said concentrate, mixing said continuously downwardly flowing concentrate continuously with an upwardly flowing solvent which is selected from said class, proportioning the ratio of the respective volumes of said intermixed concentrate and solvent to produce a spent concentrate in liquid form and whose specific gravity exceeds the specific gravity of the selected solvent, continuously separating said solvent and the dissolved 2:3 butanediol therein from said spent concentrate.

2. A method of extracting 2:3 butanediol from a beer, which consists in concentrating said beer substantially to the maximum concentration at which the concentrate remains liquid and freely miscible with a solvent for said 2:3 butanediol, the volume of said concentrated beer being substantially 10%–33⅓% of the volume of the original beer, flowing said liquid concentrate continuously in a predetermined direction through an extraction zone, continuously intermixing said flowing concentrate with said solvent in said zone while said solvent is continuously flowing in said zone in a direction reverse to the direction of flow of said concentrate, proportioning the ratio of the respective volumes of said concentrate and the intermixed solvent in said zone to produce a spent concentrate in liquid form and whose specific gravity exceeds the specific gravity of the solution of the 2:3 butanediol in said solvent, continuously separating said spent concentrate from said solution at respective opposite ends of said zone, the volume of said concentrated beer being at least substantially 33⅓% of the volume of the solvent in said zone, said solvent being selected from a class which consists of butanol, fusel oil, isopropyl acetate, and ethyl acetate.

ALFRED J. LIEBMANN.
GEORGE DE BECZE.